US012665135B2

(12) United States Patent
Aoyama et al.

(10) Patent No.: US 12,665,135 B2
(45) Date of Patent: Jun. 23, 2026

(54) MULTILAYER CERAMIC CAPACITOR

(71) Applicant: Murata Manufacturing Co., Ltd., Nagaokakyo (JP)

(72) Inventors: Hiroyuki Aoyama, Nagaokakyo (JP); Ryota Karaya, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 159 days.

(21) Appl. No.: 18/797,748

(22) Filed: Aug. 8, 2024

(65) Prior Publication Data

US 2024/0395467 A1 Nov. 28, 2024

Related U.S. Application Data

(63) Continuation of application No. PCT/JP2023/016842, filed on Apr. 28, 2023.

(30) Foreign Application Priority Data

Jun. 7, 2022 (JP) ................................ 2022-091973

(51) Int. Cl.
H01G 4/38 (2006.01)
H01G 4/232 (2006.01)
(Continued)

(52) U.S. Cl.
CPC ............... H01G 4/38 (2013.01); H01G 4/232 (2013.01); H01G 4/248 (2013.01); H01G 4/30 (2013.01)

(58) Field of Classification Search
CPC .......... H01G 4/38; H01G 4/232; H01G 4/248; H01G 4/30
See application file for complete search history.

(56) References Cited

U.S. PATENT DOCUMENTS 10,062,506 B2 * 8/2018 Choi ......................... H01G 4/30
2010/0103586 A1 * 4/2010 Tang ...................... H01G 4/232
361/301.4

(Continued)

FOREIGN PATENT DOCUMENTS

JP H03023918 U 3/1991
JP H05175088 A 7/1993
(Continued)

OTHER PUBLICATIONS

International Search Report in PCT/JP2023/016842, mailed Jul. 25, 2023, 2 pages.

(Continued)

*Primary Examiner* — Michael P Mcfadden
(74) *Attorney, Agent, or Firm* — Keating & Bennett, LLP

(57) ABSTRACT

A multilayer ceramic capacitor includes a multilayer assembly including unit multilayer bodies each including internal electrode layers and internal dielectric layers, and external electrodes at corners of the multilayer assembly. Each of the unit multilayer bodies and two of the external electrodes define a unit capacitor, and the multilayer ceramic capacitor includes multiple unit capacitors. For the multilayer assembly, two surfaces opposite to each other in a lamination direction are main surfaces, two surfaces opposite to each other in a width direction are side surfaces, and two surfaces opposite to each other in a length direction are end surfaces, and each external electrode includes an end surface portion, a side surface portion, and a main surface portion, which define three side surfaces of a triangular pyramid with one of the corners being an apex and each is substantially triangular.

20 Claims, 10 Drawing Sheets

(51) Int. Cl.
H01G 4/248      (2006.01)
H01G 4/30      (2006.01)

(56)            References Cited

U.S. PATENT DOCUMENTS

| | | | |
|---|---|---|---|
| 2019/0027312 A1 * | 1/2019 | Muramatsu | H01G 4/12 |
| 2019/0198252 A1 | 6/2019 | Son et al. | |
| 2020/0258689 A1 | 8/2020 | Kato | |
| 2021/0202173 A1 * | 7/2021 | Fujita | H01G 4/248 |

FOREIGN PATENT DOCUMENTS

| | | |
|---|---|---|
| JP | H07106732 A | 4/1995 |
| JP | 2020136298 A | 8/2020 |

OTHER PUBLICATIONS

Written Opinion in PCT/JP2023/016842, mailed Jul. 25, 2023, 3 pages.

* cited by examiner

MULTILAYER CERAMIC CAPACITOR

CROSS REFERENCE TO RELATED APPLICATIONS

This application claims the benefit of priority to Japanese Patent Application No. 2022-091973 filed on Jun. 7, 2022 and is a Continuation application of PCT Application No. PCT/JP2023/016842 filed on Apr. 28, 2023. The entire contents of each application are hereby incorporated herein by reference.

BACKGROUND OF THE INVENTION

1. Field of the Invention

The present invention relates to multilayer ceramic capacitors.

2. Description of the Related Art

In recent years, miniaturization of electronic devices has been demanded, and various approaches have been taken to achieve miniaturization of multilayer ceramic capacitors (for example, see Japanese Unexamined Patent Application, Publication No. 2020-136298).

SUMMARY OF THE INVENTION

A multilayer ceramic capacitor is mounted to a mounting board via a mounting land, and the mounting land needs to have a certain area that allows a solder fillet to be disposed. When a plurality of multilayer ceramic capacitors are arranged side by side, it is necessary to space the mounting lands apart from each other by a certain distance in order to prevent short-circuiting between the adjacent multilayer ceramic capacitors. For this reason, even if multilayer ceramic capacitors are miniaturized, there is a limit to the miniaturization of electronic devices due to the problems involved in the mounting the multilayer ceramic capacitors.

Example embodiments of the present invention provide multilayer ceramic capacitors each achieve a reduced mounting area.

An example embodiment of the present invention provides a multilayer ceramic capacitor including a multilayer assembly with a substantially rectangular parallelepiped shape and including a plurality of unit multilayer bodies, each of the unit multilayer bodies including a plurality of internal electrode layers and a plurality of internal dielectric layers alternately arranged with each other, and external electrodes respectively located at corners of the multilayer assembly, in which each of the unit multilayer bodies and two of the external electrodes define a unit capacitor, and the multilayer ceramic capacitor includes a plurality of the unit capacitors, and for the multilayer assembly, two surfaces opposite to each other in a lamination direction are defined as main surfaces, two surfaces opposite to each other in a width direction that intersects with the lamination direction are defined as side surfaces, and two surfaces opposite to each other in a length direction that intersects with the lamination direction and the width direction are defined as end surfaces, each of the external electrodes includes an end surface portion extending on one of the end surfaces, a side surface portion extending on one of the side surfaces, and a main surface portion extending on one of the main surfaces, and the end surface portion, the side surface portion, and the main surface portion respectively define three side surfaces of a triangular pyramid having one of the corners as an apex, and each have a substantially triangular shape.

Multilayer ceramic capacitors according to example embodiments of the present invention contribute to reduction of a mounting area.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
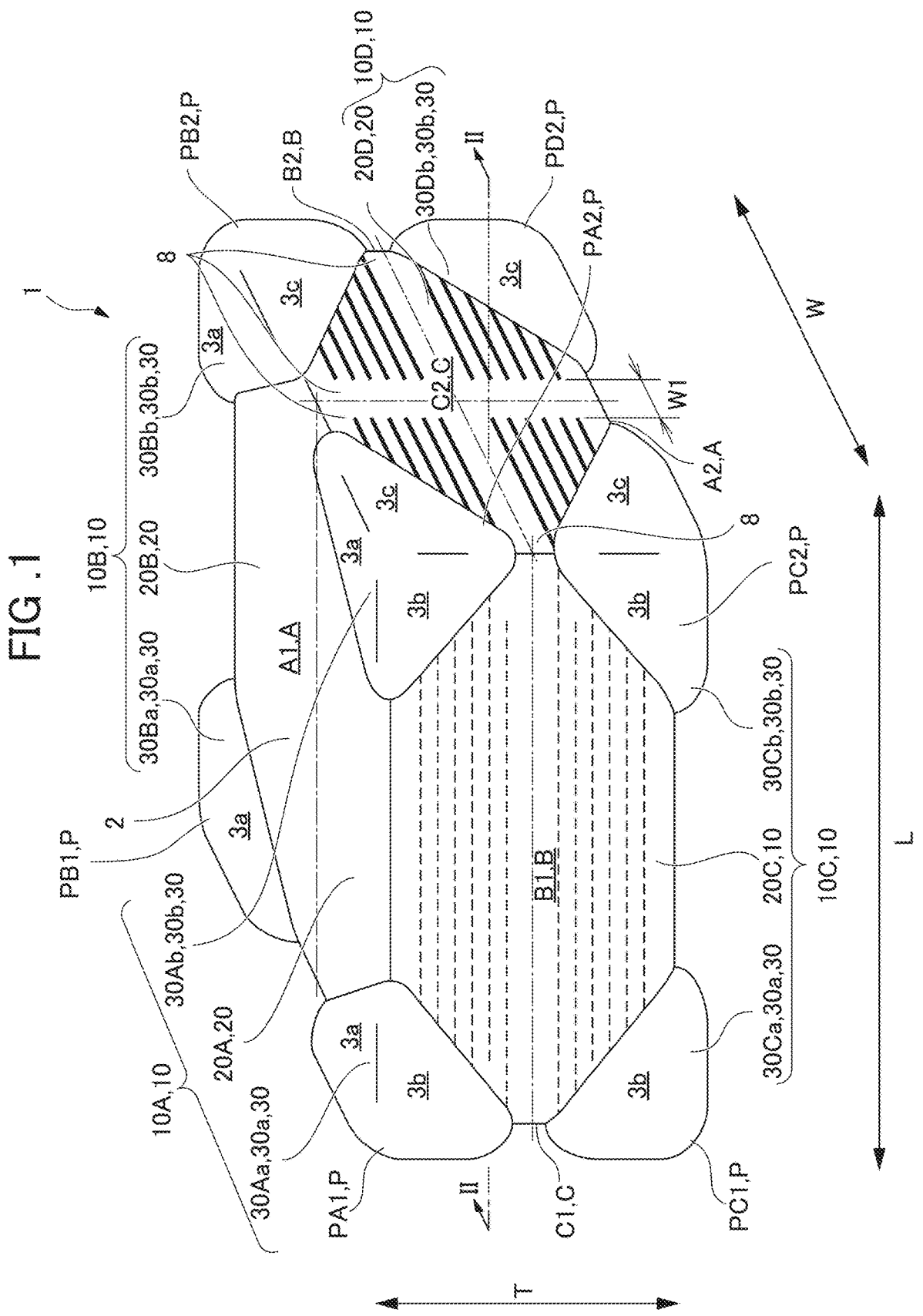
FIG. 1 is a schematic perspective view of a multilayer ceramic capacitor 1 according to an example embodiment of the present invention.
Figure 2:
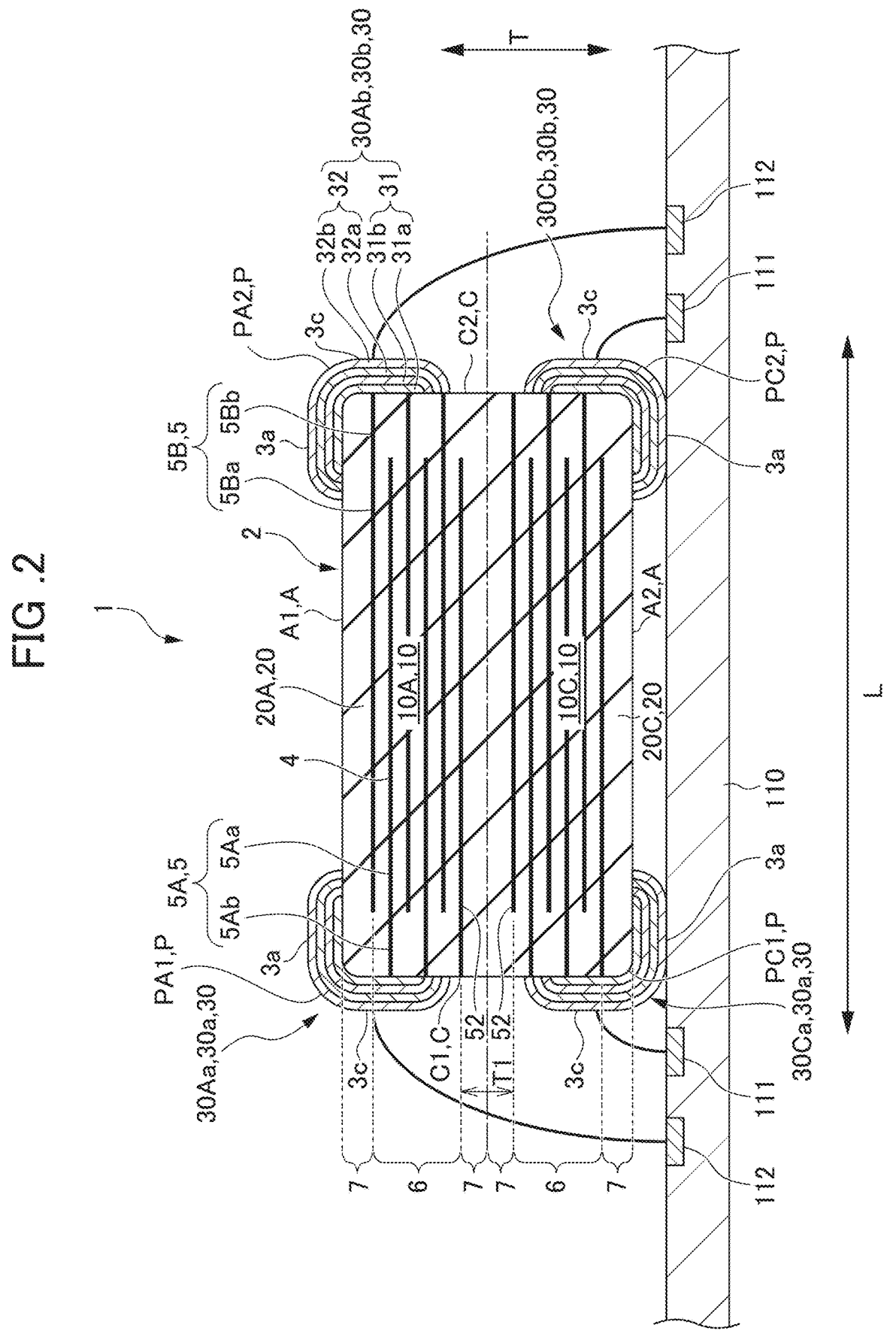
FIG. 2 is a cross-sectional view of the multilayer ceramic capacitor 1, taken along line II-II of FIG. 1.

Multilayer ceramic capacitors according to example embodiments of the present invention will be described below. FIG. 1 is a schematic perspective view of a multilayer ceramic capacitor 1 according to an example embodiment of the present invention. FIG. 2 is a cross-sectional view of the multilayer ceramic capacitor 1, taken along line II-II of FIG. 1.

In the following description, the orientation of the multilayer ceramic capacitor 1 is described using the following terms: a direction in which internal electrode layers 5 (to be described later) are laminated is referred to as a lamination direction T; a direction intersecting with the lamination direction T is referred to as a length direction L; and a direction intersecting with the lamination direction T and the length direction L is referred to as a width direction W. In the present example embodiment, the width direction W is orthogonal to both the length direction L and the lamination direction T.

In the following description, two opposite surfaces situated on both sides in the lamination direction T are referred to as a first main surface A1 and a second main surface A2. The first main surface A1 and the second main surface A2 are collectively referred to as a main surface(s) A when it is unnecessary to particularly distinguish from each other. Two opposite surfaces situated on both sides in the width direction W are referred to as a first side surface B1 and a second side surface B2. The first side surface B1 and the second side surface B2 are collectively referred to as a side surface(s) B when it is unnecessary to particularly distinguish from each other. Two opposite surfaces situated on both sides in the length direction L are referred to as a first end surface C1 and a second end surface C2. The first end surface C1 and the second end surface C2 are collectively referred to as an end surface(s) C when it is unnecessary to particularly distinguish from each other.

Multilayer Ceramic Capacitor 1

The multilayer ceramic capacitor 1 is an assembly of a plurality of unit capacitors 10. The multilayer ceramic capacitor 1 of the present example embodiment may include a total of four unit capacitors 10 that are arranged in two columns in the lamination direction T and two rows in the width direction W, for example. Specifically, the multilayer ceramic capacitor 1 includes a unit capacitor 10A adjacent to the first main surface A1 in the lamination direction T and the first side surface B1, a unit capacitor 10B adjacent to the first main surface A1 in the lamination direction T and the second side surface B2, a unit capacitor 10C adjacent to the second main surface A2 in the lamination direction T and the first side surface B1, and a unit capacitor 10D adjacent to the second main surface A2 in the lamination direction T and the second side surface B2.

The multilayer ceramic capacitor 1 of the present example embodiment has a shorter dimension in the lamination direction T than in the length direction L and in the width direction W. However, this is a non-limiting example. The dimension in the lamination direction T may be longer than that in the length direction L and that in the width direction W.

The multilayer ceramic capacitor 1 includes a multilayer assembly 2 having a substantially rectangular parallelepiped shape and external electrodes 30 disposed at eight corners P of the multilayer assembly 2.

Multilayer Assembly 2

Figure 3:
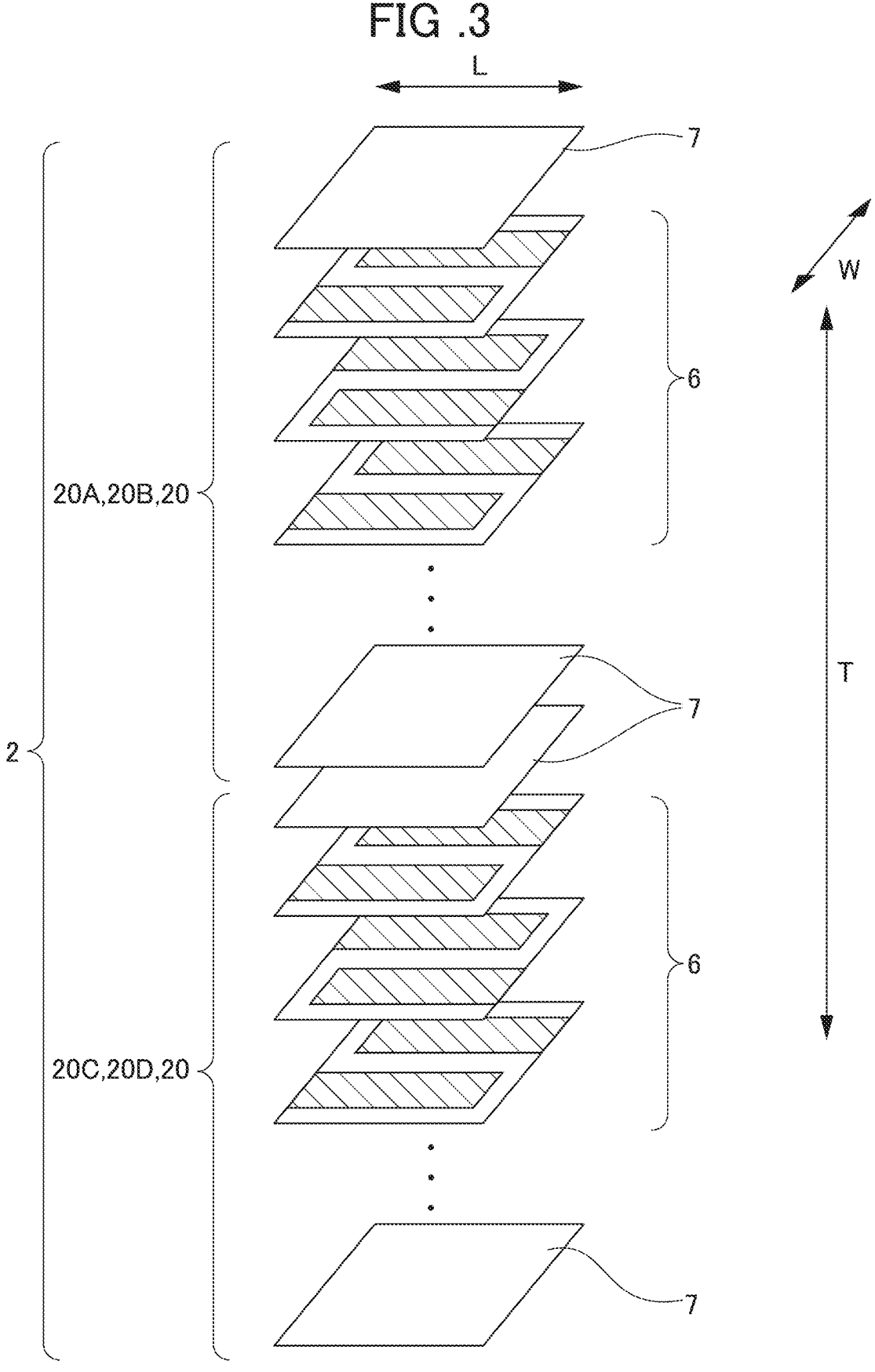
FIG. 3 is an exploded perspective view of a multilayer assembly 2.

FIG. 3 is an exploded perspective view of the multilayer assembly 2. The multilayer assembly 2 is an assembly of a plurality of unit multilayer bodies 20. In the present example embodiment, a total of four unit multilayer bodies 20 are arranged in two columns in the lamination direction T and two rows in the width direction W, for example. Each unit multilayer body 20 and the external electrodes 30 disposed at two corners P of the unit multilayer body 20 define one unit capacitor 10.

Specifically, the multilayer assembly 2 includes a unit multilayer body 20A adjacent to the first main surface A1 in the lamination direction T and the first side surface B1, a unit multilayer body 20B adjacent to the first main surface A1 in the lamination direction T and the second side surface B2, a unit multilayer body 20C adjacent to the second main surface A2 in the lamination direction T and the first side surface B1, and a unit multilayer body 20D adjacent to the second main surface A2 in the lamination direction T and the second side surface B2.

The unit multilayer body 20A is included in the unit capacitor 10A, the unit multilayer body 20B is included in the unit capacitor 10B, the unit multilayer body 20C is included in the unit capacitor 10C, and the unit multilayer body 20D is included in the unit capacitor 10D.

Unit Capacitor 10

In the present example embodiment, the unit capacitor 10A as one unit capacitor is defined by the unit multilayer body 20A and external electrodes 30Aa and 30Ab disposed at corners PA1 and PA2 of the unit multilayer body 20A, respectively.

The unit capacitor 10B as one unit capacitor is defined by the unit multilayer body 20B and external electrodes 30Ba and 30Bb disposed at corners PB1 and PB2 of the unit multilayer body 20B, respectively.

The unit capacitor 10C as one unit capacitor is defined by the unit multilayer body 20C and external electrodes 30Ca and 30Cb disposed at corners PC1 and PC2 of the unit multilayer body 20C, respectively.

The unit capacitor 10D as one unit capacitor is defined by the unit multilayer body 20D and external electrodes 30Da and 30Db disposed at corners PD1 and PD2 of the unit multilayer body 20D, respectively.

The multilayer assembly 2 has a substantially rectangular parallelepiped shape, and its corners P and ridges are preferably rounded. Each corner P is where three surfaces of the rectangular parallelepiped meet one another, and each ridge is where two surfaces of the rectangular parallelepiped meet each other.

Unit Multilayer Body 20

Each of the unit multilayer bodies 20 includes an inner layer portion 6 including a plurality of internal electrode layers 5 and a plurality of internal dielectric layers 4 alternately laminated, and outer layer portions 7 disposed on both sides of the inner layer portion 6 in the lamination direction T.

Internal Dielectric Layer 4

Each internal dielectric layer 4 has a thickness of, for example, about 0.5 $\mu$m to about 3 $\mu$m. The internal dielectric layers 4 include a dielectric material, examples of which include a dielectric ceramic material including a component such as $BaTiO_3$, $CaTiO_3$, $SrTiO_3$, or $CaZrO_3$. Alternatively, it is possible to use a material including, in addition to the main component, a component such as a Mn compound, a Fe compound, a Cr compound, a Co compound, or a Ni compound in an amount smaller than the amount of the main component.

Internal Electrode Layer 5

The internal electrode layers 5 include a plurality of first internal electrode layers 5A and a plurality of second internal electrode layers 5B. The first internal electrode layers 5A and the second internal electrode layers 5B are alternately arranged.

Each first internal electrode layer 5A includes a first counter portion 5Aa opposed to the second internal electrode layer 5B, and a first lead-out portion 5Ab extending from the first counter portion 5Aa to be led out to the first end surface C1. An end of each first lead-out portion 5Ab is exposed at the first end surface C1 and is electrically connected to a first external electrode 30a, which will be described later.

Each second internal electrode layer 5B includes a second counter portion 5Ba opposed to the first internal electrode layer 5A, and a second lead-out portion 5Bb extending from the second counter portion 5Ba to be led out to the second end surface C2. An end portion of each second lead-out portion 5Bb is exposed at the second end surface C2 and is electrically connected to a second external electrode 30b, which will be described later.

Electric charge is accumulated in the first counter portions 5Aa of the first internal electrode layers 5A and the second counter portions 5Ba of the second internal electrode layers 5B, whereby the function of a capacitor is fulfilled.

Each internal electrode layer 5 has a thickness of, for example, about 0.5 $\mu$m to about 10 $\mu$m. The internal dielectric layer 4 is disposed between the first internal electrode layer 5A and the second internal electrode layer 5B.

In the present example embodiment, the four unit capacitors 10 preferably have the same structure and the same capacitance, for example, but the present invention is not limited thereto. For example, the two unit capacitors 10 arranged in the lamination direction T, e.g., the unit capacitors 10A and 10C, may have different capacitances.

The unit capacitors 10B and 10D arranged in the lamination direction T may also have different capacitances.

Outer Layer Portion 7

Each outer layer portion 7 is made of the same dielectric ceramic material as that of the internal dielectric layers 4 included in the inner layer portion 6.

External Electrode 30

As described above, the external electrodes 30 are disposed at the eight corners P of the multilayer assembly 2.

Each unit multilayer body 20 and the external electrodes 30 disposed at two corners P of the unit multilayer body 20 define one unit capacitor 10.

The external electrodes 30 of one unit capacitor 10 include the first external electrode 30a connected to portions of the first internal electrode layers 5A that extend out to the first end surface C1, and the second external electrode 30b connected to portions of the second internal electrode layers 5B that extend out to the second end surface C2.

Furthermore, each of the external electrodes 30 has an end surface portion 3c extending on one of the end surfaces C, a side surface portion 3b extending on one of the side surfaces B, and a main surface portion 3a extending on one of the main surfaces A. The end surface portion 3c, the side surface portion 3b, and the main surface portion 3a respectively define three side surfaces of a triangular pyramid having one corner P defining an apex, and each have a substantially triangular shape.

Specifically, the first external electrode 30Aa of the unit capacitor 10A includes an end surface portion 3c extending on the first end surface C1, a side surface portion 3b extending on the first side surface B1, and a main surface portion 3a extending on the first main surface A1. The second external electrode 30Ab of the unit capacitor 10A includes an end surface portion 3c extending on the second end surface C2, a side surface portion 3b extending on the first side surface B1, and a main surface portion 3a extending on the first main surface A1.

The first external electrode 30Ba of the unit capacitor 10B includes an end surface portion 3c extending on the first end surface C1, a side surface portion 3b extending on the second side surface B2, and a main surface portion 3a extending on the first main surface A1. The second external electrode 30Bb of the unit capacitor 10B includes an end surface portion 3c extending on the second end surface C2, a side surface portion 3b extending on the second side surface B2, and a main surface portion 3a extending on the first main surface A1.

The first external electrode 30Ca of the unit capacitor 10C includes an end surface portion 3c extending on the first end surface C1, a side surface portion 3b extending on the first side surface B1, and a main surface portion 3a extending on the second main surface A2. The second external electrode 30Cb of the unit capacitor 10C includes an end surface portion 3c extending on the second end surface C2, a side surface portion 3b extending on the first side surface B1, and a main surface portion 3a extending on the second main surface A2.

The first external electrode 30Da of the unit capacitor 10D includes an end surface portion 3c extending on the first end surface C1, a side surface portion 3b extending on the second side surface B2, and a main surface portion 3a extending on the second main surface A2. The second external electrode 30Db of the unit capacitor 10D includes an end surface portion 3c extending on the second end surface C2, a side surface portion 3b extending on the second side surface B2, and a main surface portion 3a extending on the second main surface A2.

Each of the external electrodes 30 includes a base electrode 31 including Cu and glass, and a plated layer 32 formed on the base electrode 31.

Base Electrode 31

The base electrode 31 preferably includes at least one of a fired layer 31a, a resin layer 31b, a thin film layer, etc. The base electrode 31 of the present example embodiment includes the fired layer 31a and the resin layer 31b.

Fired Layer 31a

The fired layer 31a is formed by firing a conductive paste applied to the multilayer assembly and including glass and metal, and may be formed by firing the conductive paste concurrently with or after firing the internal electrode layers 5. The metal included in the fired layer 31a includes, for example, at least one of Cu, Ni, Ag, Pd, Ag—Pd alloy, Au, etc.

In the case where a thin film layer is included, the thin film layer is formed by a thin film forming method such as sputtering or vapor deposition. The thin film layer is made of deposited metal particles and has a thickness of about 1 μm or less, for example.

Resin Layer 31b

The resin layer 31b preferably includes conductive particles and a thermosetting resin. The resin layer 31b may be formed directly on the multilayer assembly 2 without the fired layer 31a. The resin layer 31b may include a plurality of layers.

Plated Layer 32

The plated layer 32 includes, for example, at least one of Cu, Ni, Ag, Pd, Ag—Pd alloy, Au, etc. The plated layer 32 may be defined by a plurality of layers. The plated layer 32 of the present example embodiment preferably includes a two-layer structure including a Ni plated layer 32a and a Sn plated layer 32b. The Ni plated layer 32a can prevent the base electrode 31 from being eroded by solder that is used to mount the multilayer ceramic capacitor, and the Sn plated layer 32b can improve wettability of the solder and facilitates the mounting.

Dielectric Layer

As illustrated in FIG. 2, in the multilayer ceramic capacitor 1 of the present example embodiment, the unit capacitor 10A and the unit capacitor 10C are adjacent to each other in the lamination direction T.

Two outer layer portions 7 are provided between the internal electrode layer 51 of the unit capacitor 10A and is closest to the unit capacitor 10C and the internal electrode layer 52 of the unit capacitor 10C and is closest to the unit capacitor 10A, and a total thickness T1 of the two outer layer portions 7 as a dielectric layer is larger than a thickness T1 of the internal dielectric layer 4 in each unit capacitor 10.

Therefore, the unit capacitor 10A and the unit capacitor 10C are sufficiently insulated from each other.

The same applies to the unit capacitor 10B and the unit capacitor 10D adjacent to each other in the lamination direction T. That is, two outer layer portions 7 are provided between the internal electrode layer of the unit capacitor 10B and is closest to the unit capacitor 10D and the internal electrode layer of the unit capacitor 10D and is closest to the unit capacitor 10B, and a total thickness T1 of the two outer layer portions 7 as a dielectric layer is larger than a thickness T2 of the internal dielectric layer 4 in each unit capacitor 10. Therefore, the unit capacitor 10B and the unit capacitor 10D are also sufficiently insulated from each other.

In addition to the two outer layer portions 7, a further dielectric layer may be provided between the two unit capacitors 10 adjacent to each other in the lamination direction T. The further dielectric layer or the two outer layer portions 7 may include a dielectric layer including a larger number of voids than the other dielectric layers.

As illustrated in FIG. 1, in the multilayer ceramic capacitor 1 of the present example embodiment, the unit capacitor 10A and the unit capacitor 10B are adjacent to each other in the width direction W, and each of the unit capacitors 10A and 10B has, on both sides in the width direction W, a side gap portion 8 which is defined by the dielectric layers and in which the internal electrode layers 5 are not arranged.

Specifically, two side gap portions 8 are provided between a set of the internal electrode layers 5 of the unit capacitor 10A and a set of the internal electrode layers 5 of the unit capacitor 10B, and a total thickness W1 of the side gap portions 8 as a dielectric layer is larger than a thickness W1/2 of the side gap portion 8 of each unit capacitor 10. Therefore, the unit capacitor 10A and the unit capacitor 10B are sufficiently insulated from each other.

Two side gap portions 8 are provided between a set of the internal electrode layers 5 of the unit capacitor 10C and a set of the internal electrode layers 5 of the unit capacitor 10D, and a total thickness W1 of the side gap portions 8 as a dielectric layer is larger than a thickness W1/2 of the side gap portion 8 of each unit capacitor 10. Therefore, the unit capacitor 10C and the unit capacitor 10D are also sufficiently insulated from each other.

In addition to the two side gap portions 8, a further dielectric layer may be provided between the two unit capacitors 10 adjacent to each other in the width direction W. The further dielectric layer or the two adjacent side gap portions 8 may include a dielectric layer including a larger number of voids than the other side gap portions 8.

Although the multilayer ceramic capacitor 1 of the present example embodiment is depicted in such a manner that the first lead-out portions 5Ab and the second lead-out portions 5Bb of the internal electrode layers 5 have portions exposed at the end surfaces C without being covered with the external electrodes 30, it is preferable to coat the portions with an insulating material or the like.

Method of Manufacturing Multilayer Ceramic Capacitor 1

Figure 4:
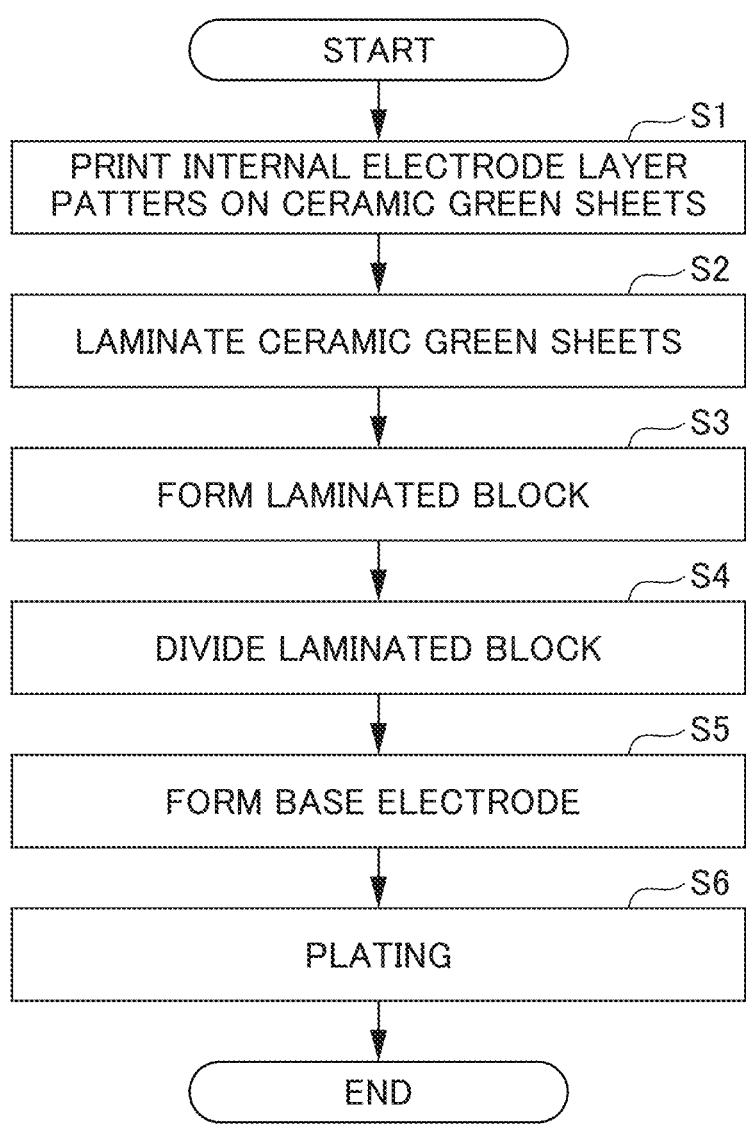
FIG. 4 is a flowchart illustrating a method of manufacturing the multilayer ceramic capacitor 1.

Next, a non-limiting example of a method of manufacturing the multilayer ceramic capacitor 1 will be described. FIG. 4 is a flowchart illustrating a method of manufacturing the multilayer ceramic capacitor 1.

Ceramic Green Sheet Printing Step S1

In Step S1, a ceramic slurry including ceramic powder for dielectric sheet, a binder, and a solvent is applied into a sheet shape on a carrier film, thereby forming inner-layer-portion-forming ceramic green sheets.

Subsequently, a conductive paste that is to form the internal electrode layers and includes a metal powder, a binder, an additive such as a plasticizer and a dispersant, an organic solvent, etc., is printed on the inner-layer-portion-forming ceramic green sheets by way of screen printing, inkjet printing, gravure printing, or the like, thereby forming internal electrode layer patterns.

At this time, for example, as illustrated in FIG. 3, internal electrode layer patterns for two unit capacitors 10 are formed on one inner-layer-portion-forming ceramic green sheet in regions opposite in the width direction W such that the two internal electrode layer patterns extend in the length direction L and are arranged side by side.

Furthermore, a predetermined number of inner-layer-portion-forming ceramic green sheets are prepared, which do not have an internal electrode layer patterns printed thereon.

Laminating Step S2

Next, as illustrated in FIG. 3, a plurality of the inner-layer-portion-forming ceramic green sheets for forming the unit multilayer bodies 20A and 20B are laminated such that the internal electrode layer patterns are shifted by a half pitch in the length direction L between the inner-layer-portion-forming ceramic green sheets adjacent to each other in the lamination direction T.

Furthermore, on both sides in the lamination direction T of the resultant laminate of the inner-layer-portion-forming ceramic green sheets for forming the unit multilayer bodies 20A and 20B, outer-layer-portion-forming ceramic green sheets that are to form the outer layer portions 7 are laminated, whereby a first sheet laminate including the ceramic green sheets is produced.

A plurality of the inner-layer-portion-forming ceramic green sheets for forming the unit multilayer bodies 20C and 20D are laminated such that the internal electrode layer patterns are shifted by a half pitch in the length direction L between the inner-layer-portion-forming ceramic green sheets adjacent to each other in the lamination direction T.

Furthermore, on both sides in the lamination direction T of the resultant laminate of the inner-layer-portion-forming ceramic green sheets for forming the unit multilayer bodies 20C and 20D, outer-layer-portion-forming ceramic green sheets that are to form the outer layer portions 7 are laminated, whereby a second sheet laminate including the ceramic green sheets is produced.

Laminated Block Forming Step S3

The first sheet laminate and the second sheet laminate are stacked together, and the resultant laminate is pressed in the lamination direction by hydrostatic pressing or the like, thereby producing a laminated block.

Laminated Block Dividing Step S4

The laminated block is cut and divided into multilayer assemblies 2 having a predetermined size. At this time, it is preferable to round the corners P and the ridges of the multilayer assemblies 2 by barrel polishing or the like.

Base Electrode Forming Step S5

The corners P of the multilayer assembly 2 are dipped into a conductive paste for forming the base electrodes 31, which is made of a metal powder, a binder, an additive such as a plasticizer and a dispersant, an organic solvent, etc., whereby the corners P are coated with the conductive paste.

Figure 5A:
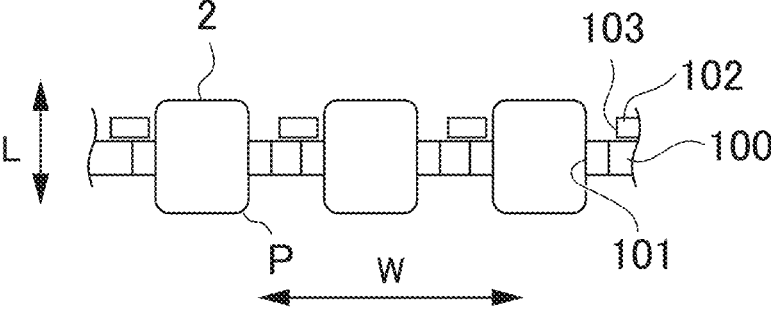
FIGS. 5A to 5C are diagrams illustrating a base electrode forming step S5.
Figure 5B:
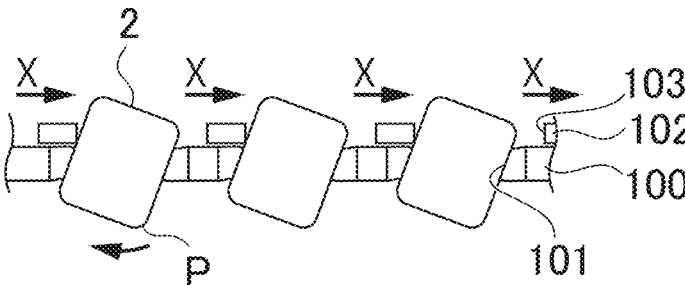
Figure 5C:
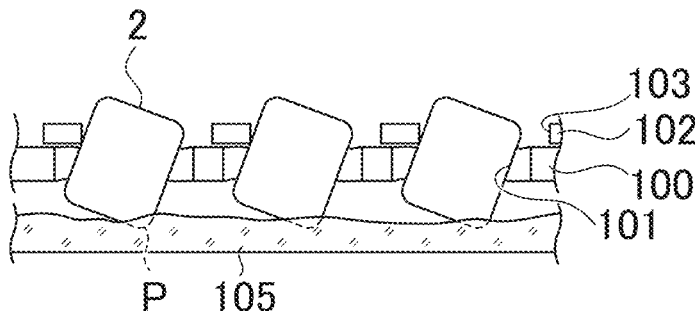

FIG. 5 is a diagram illustrating the base electrode forming step S5. First, a holding plate 100 is provided. The holding plate 100 is a plate-shaped structure with holding cavities 101 that are a plurality of through holes arranged at predetermined intervals, and each of the holding cavities 101 has an elastic body, such as silicone rubber, attached to an inner peripheral surface thereof.

A loading plate 102 is set on the holding plate 100. The loading plate 102 is a plate-shaped structure including pressing cavities 103 that are a plurality of through holes arranged corresponding to the holding cavities 101. The pressing cavity 103 is larger than the holding cavity 101.

The loading plate 102 is slidable with respect to the holding plate 100. The loading plate 102 can be slid not only in the direction indicated by the arrows X in FIG. 5B but also in a direction orthogonal to the arrows X.

As illustrated in FIG. 5A, the plurality of multilayer assemblies 2 are respectively held in the holding cavities 101. The multilayer assemblies 2 are disposed in the holding cavities 101 and the pressing cavities 103 on a one-to-one basis.

At this time, since each multilayer assembly 2 of the present example embodiment has the longest dimension in the length direction L, it is preferable to dispose each multilayer assembly 2 in the holding cavity 101 and the pressing cavity 103 so that its surfaces corresponding to the length direction L are oriented vertically. It is preferable that the loading plate 102 and the holding plate 100 be smaller in thickness than the dimension in the length direction L of the multilayer assembly 2. This configuration, in which the plates 102 and 100 are thinner, causes the corners P of each multilayer assembly 2 to be sufficiently exposed, thereby making it easy to apply the conductive paste to the corners P.

Next, as illustrated in FIG. 5B, the loading plate 102 is moved with respect to the holding plate 100 in the direction indicated by the arrows X in FIG. 5B and in a direction (not shown) orthogonal to the arrows X.

Consequently, the inner surfaces of the pressing cavities 103 of the loading plate 102 press the ridges of the multilayer assembles 2. Since the elastic body is attached to the inner peripheral surface of each holding cavity 101, the multilayer assemblies 2 are inclined with respect to the holding plate 100 while being held in the holding cavities 101.

The multilayer assembles 2 are inclined as illustrated in FIG. 5B, whereby one corner P is positioned lower than the other corners P. In this state, the corner P positioned lower is dipped into the conductive paste included in a paste tank 105, and the conductive paste is applied to the corner P. As a result, the conductive paste is applied to the one corner P, which is formed of the sides surfaces of a triangular pyramid. The conductive paste may be applied two or more times.

After the applied conductive paste is dried, the multilayer assemblies 2 are inclined so that corners P to which the conductive paste is to be applied is sequentially positioned lower, and the conductive paste is applied in the shape of the side surfaces of a triangular pyramid and dried.

Thereafter, heating is performed at a preset firing temperature for a predetermined time in a nitrogen atmosphere, whereby the conductive paste is fired onto the multilayer assembles 2.

The firing temperature is preferably about 900° C. to about 1300° C., for example, although it depends on the materials forming the dielectric and the internal electrodes. A target chip preferably has a size of 18 or larger.

The resin layer 31b is further formed over the corners P of the multilayer assemblies 2, to which the fired layer 31a have been attached in the above described manner. The resin layer 31b may be formed in the same manner as in the case of the base electrode 31.

Plating Step S6

Next, the Ni plated layer 32a is formed to cover the outer surface of the base electrode 31 including the fired layer 31a and the resin layer 31b. The Ni plated layer 32a can prevent the base electrode 31 from being eroded by solder that is used to mount the multilayer ceramic capacitor 1.

The Sn plated layer 32b is formed to cover the outer surface of the Ni plated layer 32a. The Sn plated layer 32b improves the wettability of the solder that is used to mount the multilayer ceramic capacitor 1, and facilitates the mounting.

Mounting Method

The multilayer ceramic capacitor 1 manufactured in the manner described above is mounted on a mounting board 110. FIG. 2 illustrates an example of a mounting method in which the multilayer ceramic capacitor 1 of the present example embodiment is wire-bonded to the mounting board 110. Each of the unit capacitors 10 is wire-bonded to a mounting land 112 or a mounting land 111 of the mounting board 110. In the case of wire bonding, the plated layer as the outermost layer of each external electrode 30 may be a gold plated layer instead of the Sn plated layer.

As described above, the multilayer ceramic capacitor 1 of the present example embodiment includes the unit capacitors 10A, 10C, 10B, and 10D that are integrated.

The unit capacitors 10A and 10C are stacked in the lamination direction T, and the unit capacitors 10B and 10D are stacked in the lamination direction T. In other words, the two unit capacitors 10 are arranged in the lamination direction T. Therefore, according to the present example embodiment, the mounting area can be reduced to about ½ in comparison with a case where one unit capacitor 10 is disposed in the lamination direction T.

In the multilayer ceramic capacitor 1 of the example embodiment, the unit capacitors 10A, 10B, 10C, and 10D may be integrated, for example.

Here, two external electrodes of a typical multilayer ceramic capacitor are each disposed on one end surface, extend to two main surfaces and two side surfaces surrounding the one end surface, and thus, extend on a total of five surfaces, for example. It is impossible to provide such an external electrode extending on five surfaces to the multilayer ceramic capacitor 1 of the present example embodiment in which the plurality of unit capacitors 10 are integrated.

However, the external electrodes 30 of the present example embodiment each extend in the shape of the three surfaces of a triangular pyramid including one corner portion P defining an apex. By virtue of this shape, the external electrodes 30 can be formed even on the multilayer ceramic capacitor 1 in which the plurality of unit capacitors 10 are integrated.

The external electrode 30 having the shape of the side surfaces of a triangular pyramid having one corner P as an apex can be formed by using the holding plate 100 and the loading plate 102 described above.

Unlike the present example embodiment, in a case of arranging two independent multilayer ceramic capacitors in the horizontal direction, it is necessary to space the two multilayer ceramic capacitors apart from each other by a certain distance so that the external electrodes 30 do not connect to each other.

In contrast, in the multilayer ceramic capacitor 1 of the present example embodiment, the unit capacitors 10A and 10B are integrated in the horizontal direction, and the unit capacitors 10C and 10D are integrated in the horizontal direction. The external electrodes 30 each have the shape of side surfaces of a triangular pyramid having a corner portion P as an apex, and accordingly, are kept from connecting to each other.

Thus, it is not necessary to space two multilayer ceramic capacitors apart from each other, thereby making it possible to reduce the mounting area also in the horizontal direction.

Figure 6:
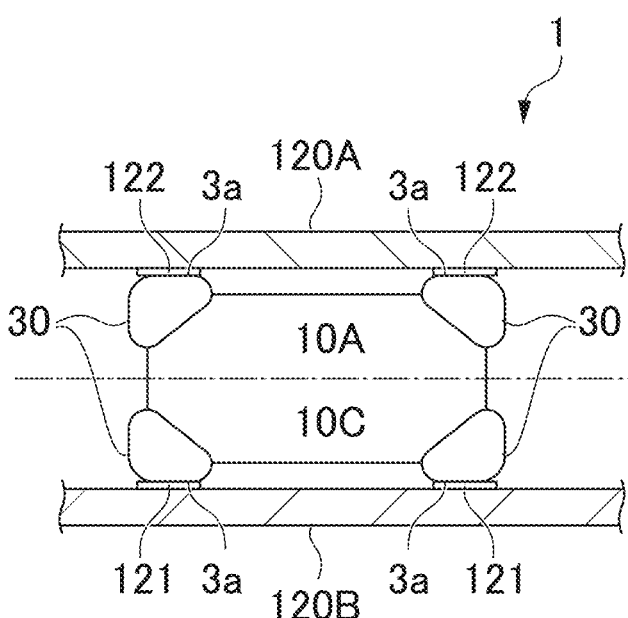
FIG. 6 is a diagram illustrating another way of mounting a multilayer ceramic capacitor 1 of an example embodiment of the present invention.

It should be noted that the example embodiments described above are not intended to limit the present invention. FIG. 6 is a diagram for explaining another method of mounting the multilayer ceramic capacitor 1 of another example embodiment. The wire-bonding described above is a non-limiting example, and as illustrated in FIG. 6, the multilayer ceramic capacitor 1 may be sandwiched between two mounting boards, i.e., a mounting board 120A and a mounting board 120B.

Also in this case, the unit capacitor 10A and the unit capacitor 10C are stacked in the lamination direction T, and the unit capacitor 10B (not shown in FIG. 6) and the unit capacitor 10D (not shown in FIG. 6) are stacked in the lamination direction T.

Therefore, the present example embodiment can reduce the mounting area to about ½ in comparison with a case where only one unit capacitor 10 is disposed in the lamination direction T.

Furthermore, each external electrode 30 has the shape of the side surfaces of a triangular pyramid, as described above. Accordingly, the main surface portion 3a of the external electrode 30 extending adjacent to the mounting board 120A or the mounting board 120B is also triangular. Therefore, it is suitable to form a mounting land 121 and a mounting land 122 into a triangular shape, thus contributing to the reduction of the mounting area. Moreover, solder fillets are also formed in conformity with the mounting land 121 and the mounting land 122, thus saving the amount of solder.

Figure 7:
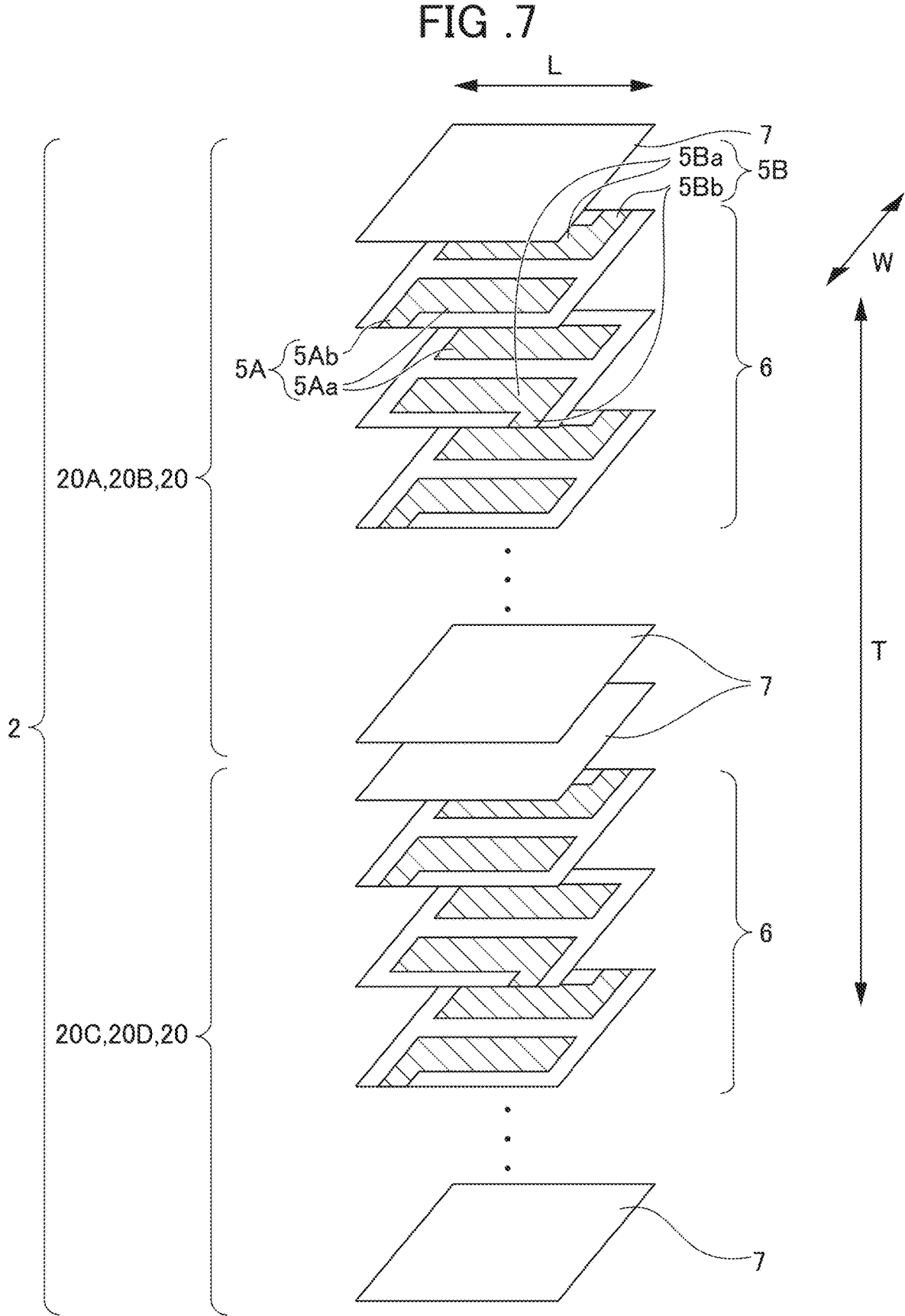
FIG. 7 is an exploded perspective view of a multilayer assembly 2 in a multilayer ceramic capacitor according to a modification of an example embodiment of the present invention.

In the present example embodiment, the first internal electrode layers 5A are exposed at the first end surface C1, and the second internal electrode layers 5B are exposed at the second end surface C2. However, this is a non-limiting example. FIG. 7 is an exploded perspective view of a multilayer assembly 2 for a multilayer ceramic capacitor according to another modification of an example embodiment of the present invention, and corresponds to FIG. 3 of the present example embodiment. The same reference signs as those in the present example embodiment are used to describe the modification.

Also in the modification, each first internal electrode layer 5A includes a first counter portion 5Aa opposed to a second internal electrode layer 5B, and a first lead-out portion 5Ab extending from the first counter portion 5Aa. Each second internal electrode layer 5B includes a second counter portion 5Ba opposed to the first internal electrode layer 5A, and a second lead-out portion 5Bb extending from the second counter portion 5Ba.

However, the first lead-out portions 5Ab and the second lead-out portions 5Bb of the unit capacitor 10A and the unit capacitor 10C are exposed at the first side surface B1. The first lead-out portions 5Ab and the second lead-out portions 5Bb of the unit capacitor 10B and the unit capacitor 10D are exposed at the second side surface B2.

Also in this modification, the first lead-out portions 5Ab and the second lead-out portions 5Bb of the unit capacitor 10A and the unit capacitor 10C and exposed at the first side surface B1 can be connected to the external electrodes 30 having the same shape as that of the present example embodiment. The first lead-out portions 5Ab and the second lead-out portions 5Bb of the unit capacitor 10B and the unit capacitor 10D and exposed at the second side surface B2 can be connected to the external electrodes 30 having the same shape as that of the present example embodiment.

Figure 8:
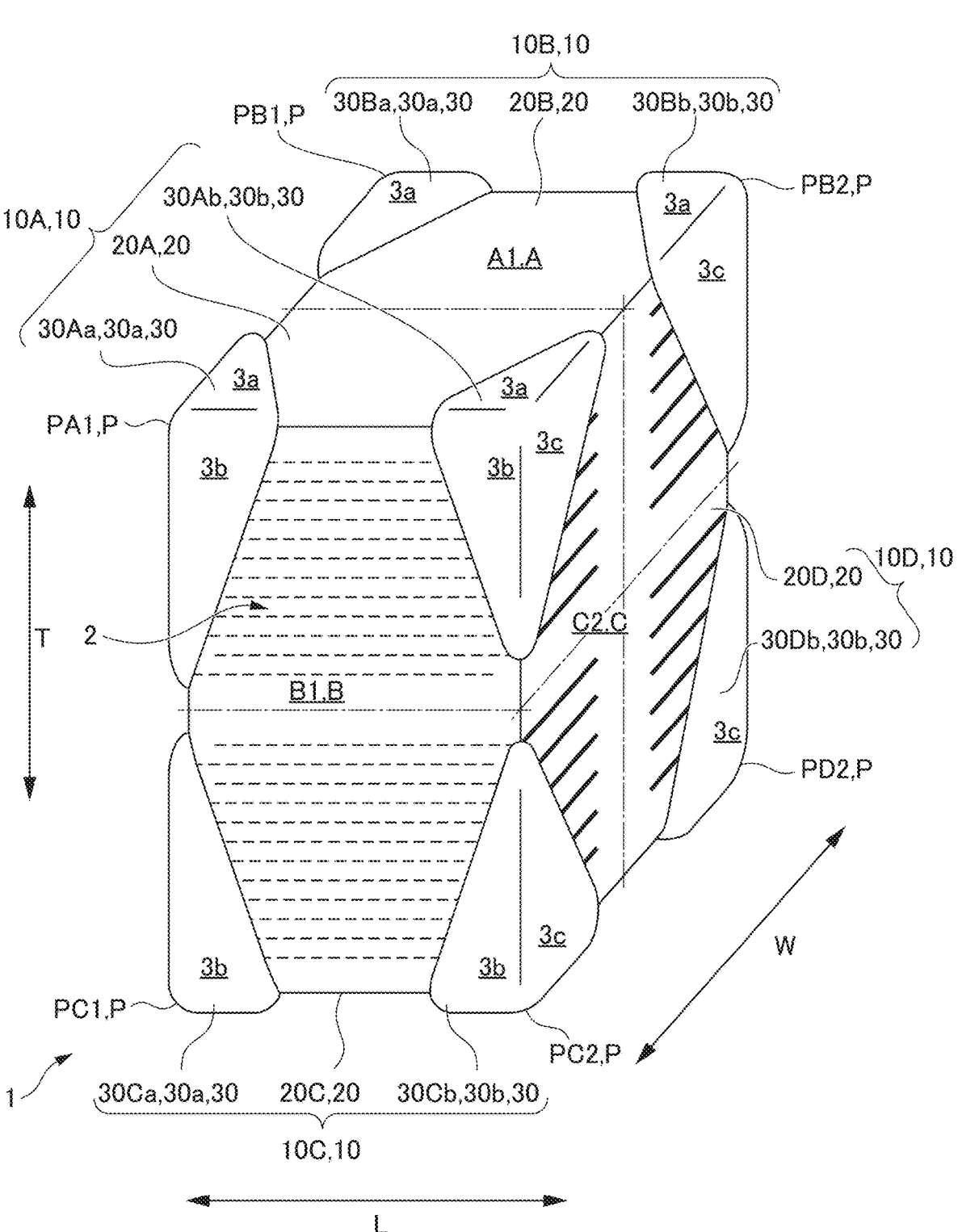
FIG. 8 is a diagram illustrating a modification of an example embodiment of a multilayer ceramic capacitor 1.

FIG. 8 is a diagram illustrating a yet another modification of the multilayer ceramic capacitor 1. The multilayer ceramic capacitor 1 of the above-described example embodiment has a shorter dimension in the lamination direction T than in the length direction L and the width direction W. However, the present invention is not limited thereto, and the dimension in the lamination direction T may be longer than that in the length direction L and that in the width direction W, as illustrated in FIG. 8.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer assembly with a substantially rectangular parallelepiped shape and including a plurality of unit multilayer bodies, each of the unit multilayer bodies including a plurality of internal electrode layers and a plurality of internal dielectric layers alternately arranged with each other; and
external electrodes respectively located at corners of the multilayer assembly; wherein
each of the unit multilayer bodies and two of the external electrodes define a unit capacitor, and the multilayer ceramic capacitor includes a plurality of the unit capacitors, and for the multilayer assembly, two surfaces opposite to each other in a lamination direction are defined as main surfaces, two surfaces opposite to each other in a width direction that intersects with the lamination direction are defined as side surfaces, and two surfaces opposite to each other in a length direction that intersects with the lamination direction and the width direction are defined as end surfaces;
each of the external electrodes includes:
an end surface portion extending on one of the end surfaces;
a side surface portion extending on one of the side surfaces; and
a main surface portion extending on one of the main surfaces; and
the end surface portion, the side surface portion, and the main surface portion respectively define three side surfaces of a triangular pyramid with one of the corners defining an apex, and each has a substantially triangular shape.

2. The multilayer ceramic capacitor according to claim 1, wherein the unit capacitors include a total of four unit capacitors that are arranged in two columns in the lamination direction and two rows in the width direction.

3. The multilayer ceramic capacitor according to claim 2, wherein each of the four unit capacitors have a same structure.

4. The multilayer ceramic capacitor according to claim 2, wherein each of the four unit capacitors have a same capacitance.

5. The multilayer ceramic capacitor according to claim 2, wherein two of the four unit capacitors have different capacitances.

6. The multilayer ceramic capacitor according to claim 1, wherein
the two end surfaces include a first end surface and a second end surface;
the internal electrode layers of each of the unit capacitors include:
first internal electrode layers that extend out to the first end surface or one of the two side surfaces; and
second internal electrode layers that extend out to the second end surface or the one of the two side surfaces and alternate with the first internal electrode layers; and
the external electrodes of each of the unit capacitors include:
a first external electrode and a second external electrode;
the first external electrode:
being connected to the first internal electrode layers; and
having the end surface portion extending on the first end surface;

the side surface portion extending on the one of the two side surfaces; and the main surface portion extending on one of the two main surfaces;

the second external electrode:

being connected to the second internal electrode layers; and having the end surface portion extending on the second end surface;

the side surface portion extending on the one of the two side surfaces; and the main surface portion extending on the one of the two main surfaces.

7. The multilayer ceramic capacitor according to claim 1, wherein two of the unit capacitors are adjacent to each other in the lamination direction; and a dielectric layer is provided between the internal electrode layer of one of the two of the unit capacitors and located closest to another of the two of the unit capacitors and the internal electrode layer of the another of the two of the unit capacitors and located closest to the one of the two of the unit capacitors, and the dielectric layer is thicker than the internal dielectric layer of each of the unit capacitors.

8. The multilayer ceramic capacitor according to claim 1, wherein the multilayer ceramic capacitor has a shorter dimension in the lamination direction than in the length direction and the width direction.

9. The multilayer ceramic capacitor according to claim 1, wherein the multilayer ceramic capacitor has a longer dimension in the lamination direction than in the length direction and the width direction.

10. The multilayer ceramic capacitor according to claim 1, wherein one of the external electrodes is located at each of eight corners of the multilayer assembly.

11. The multilayer ceramic capacitor according to claim 1, wherein each of the plurality of internal dielectric layers has a thickness of about 0.5 μm to about 3 μm.

12. The multilayer ceramic capacitor according to claim 1, wherein each of the plurality of internal dielectric layers includes $BaTiO_3$, $CaTiO_3$, $SrTiO_3$, or $CaZrO_3$.

13. The multilayer ceramic capacitor according to claim 1, wherein each of the plurality of internal electrode layers has a thickness of about 0.5 μm to about 10 μm.

14. The multilayer ceramic capacitor according to claim 1, wherein each of the external electrodes includes a base electrode and a plated layer.

15. The multilayer ceramic capacitor according to claim 14, wherein the base electrode includes at least one of a fired layer, a resin layer, or a thin film layer.

16. The multilayer ceramic capacitor according to claim 1, wherein at least two of the plurality of unit capacitors are insulated from each other.

17. The multilayer ceramic capacitor according to claim 1, wherein multiple dielectric layers are provided between respective adjacent pairs of the plurality of unit capacitors.

18. The multilayer ceramic capacitor according to claim 1, wherein side gap portions are provided between a set of the internal electrode layers of a first one of the unit capacitors and a set of internal electrode layers of a second one of the unit capacitors.

19. The multilayer ceramic capacitor according to claim 18, wherein a total thickness of the side gap portions provided between the set of the internal electrode layers of the first one of the unit capacitors and the set of internal electrode layers of the second one of the unit capacitors is larger than a thickness of a side gap portion included in each of the unit capacitors.

20. The multilayer ceramic capacitor according to claim 1, wherein side gap portions and dielectric films are provided between respective adjacent pairs of the unit capacitors.

* * * * *